E. ROBIDEAU.
EXTENSION BACK FOR VEHICLE SEATS.
APPLICATION FILED JUNE 8, 1916.
1,234,571.
Patented July 24, 1917.
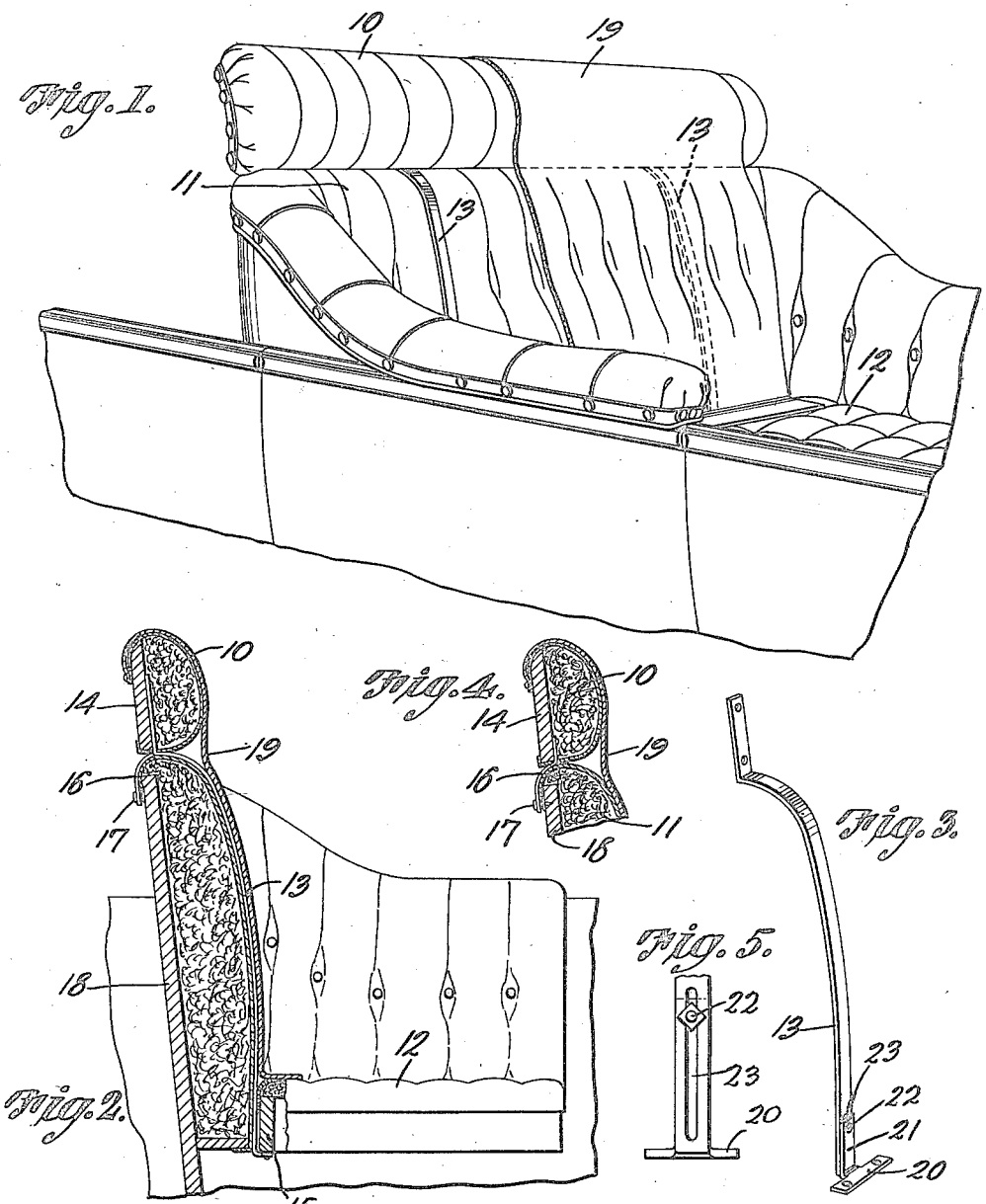
Witnesses
Eli Robideau Inventor
by
Attorneys

UNITED STATES PATENT OFFICE.

ELI ROBIDEAU, OF MALONE, NEW YORK.

EXTENSION-BACK FOR VEHICLE-SEATS.

1,234,571.	Specification of Letters Patent.	Patented July 24, 1917.

Application filed June 8, 1916. Serial No. 102,528.

*To all whom it may concern:*

Be it known that I, ELI ROBIDEAU, a citizen of the United States, residing at Malone, in the county of Franklin and State of New York, have invented a new and useful Extension-Back for Vehicle-Seats, of which the following is a specification.

The object of the invention is to provide a readily attachable extension back for vehicle seats, where additional supports, as for example for the shoulder blades of the rider are desired, the seat back with which the vehicle was originally provided being too low to afford such support, and said extension back being such as to be applicable to the regular or fixed seat back without affecting the function of the latter, but on the other hand taking advantage of the resilience of the cushions of said regular or permanent seat back, to insure coöperative yielding movement of both the permanent and the extension backs.

A further object of the invention is to provide an extension back which if desired may be removed and re-attached at will, and wherein the means of attachment are such as not to mar or injure either the permanent seat back or the portion of the vehicle seat frame to which the same may be secured.

Further objects and advantages of the invention will appear in the following description of a preferred form of the device, it being understood that various changes in the form, proportions and details of construction may be resorted to within the scope of the claims without departing from the spirit of the invention.

In the drawings:—

Figure 1 is a perspective view of the extension back arranged in operative position with reference to a permanent seat back.

Fig. 2 is a vertical sectional view of the same.

Fig. 3 is a detail perspective view of one of the rest supporting arms detached.

Fig. 4 is a detail sectional view similar to Fig. 2 in the plane of the retaining straps to show the relative arrangement thereof.

Fig. 5 is a detail view showing the adjustable foot.

The extension back embodies essentially a preferably padded or cushioned rest 10, designed for arrangement above the permanent seat back 11 of the usual automobile or other vehicle seat 12, and suitably secured to and depending from said rest are arms 13, preferably attached at their upper ends to the wooden back 14 of said rest and thence extending forward over the upper portion of the permanent seat back and thence downward in contact with the cushioned surface of said permanent back and carried to a point below the plane of the surface of the seat 12 where they may be secured in any suitable manner to the frame 15 of said seat. In operation the rearward pressure against the rest causes the embedding of said arms, which are made relatively thin, into the surface of the cushion of said seat back, whereby said arms obtain the advantage of the resilience of said seat back cushions and thereby convey the yielding effect to the rest. In addition, the arms 13 may be made of steel or other yielding or resilient material so as to increase this yielding or resilient action of the rest, and to limit the forward movement of the rest there may be provided a strap or a series of straps 16 designed to be engaged for example with buttons 17 on the frame or wooden portion 18 of the permanent seat back.

Moreover, these limiting devices are arranged preferably in such a way as to perform the additional function of spacers to hold the lower edge of the rest out of contact with the upper surface of the permanent seat back, and to this end the straps are extended forwardly and secured as shown to the front surface of the frame or wood portion of the rest, and hence in the same plane with the upper extremities of the arms. The straps therefore extend between the proximate portions of the seat rest and seat back and receive the wear due to the movement of the rest with relation to the permanent seat back.

Also preferably secured to the rest, as near the upper edge of the frame portion 14 thereof, is a curtain 19 which thence passes over the rest and hangs down in contact with the front surfaces of said rest and seat back, to thereby conceal the joint or break between the rest and said seat back.

It will be noted that the construction described provides for readily applying an extension back of any desired depth to the permanent seat back of a vehicle and without the exposure of the means of attachment or support, without detracting in any way from the efficiency of the usually cushioned and frequently handsomely upholstered seat back, without risk of injury to the surface of said seat back, and without inconvenience to the occupant of the seat, for the reason that as the rest is repressed by the application of rearwardly bearing pressure, the arms which depend from the rest, embed themselves in the surface of the permanent seat back, while at the same time taking up the resilience or spring action of said seat back.

In order to adapt the attachment to seat backs of different heights, the foot 20 at the lower end of the arm 13 may be provided with a stem 21 carrying a bolt 22 for engagement with a slot 23 in the lower portion of said arm, as shown particularly in Figs. 3 and 5.

What is claimed is:—

1. An extension back for vehicle seats, having a rest for arrangement above the seat back, arms depending from the rest to bear upon and conform to the surface of the seat back, said arms being provided at their lower ends with means for attachment to the seat frame, and a wear device extending under the rest and constituting means for limiting the forward movement of the rest.

2. An extension back for vehicle seats, having a rest for arrangement above the seat back, arms depending from the rest to bear upon the front surface of the seat back and provided at their lower ends with means for attachment to the seat frame, and flexible wear receiving means connected with and extending under the rest for engagement with the seat back to limit the forward movement of the rest.

In testimony that I claim the foregoing as my own, I have hereto affixed my signature in the presence of two witnesses.

ELI ROBIDEAU.

Witnesses:
F. P. ELDREDGE,
H. H. SEAVER.